United States Patent Office 3,528,286
Patented Sept. 15, 1970

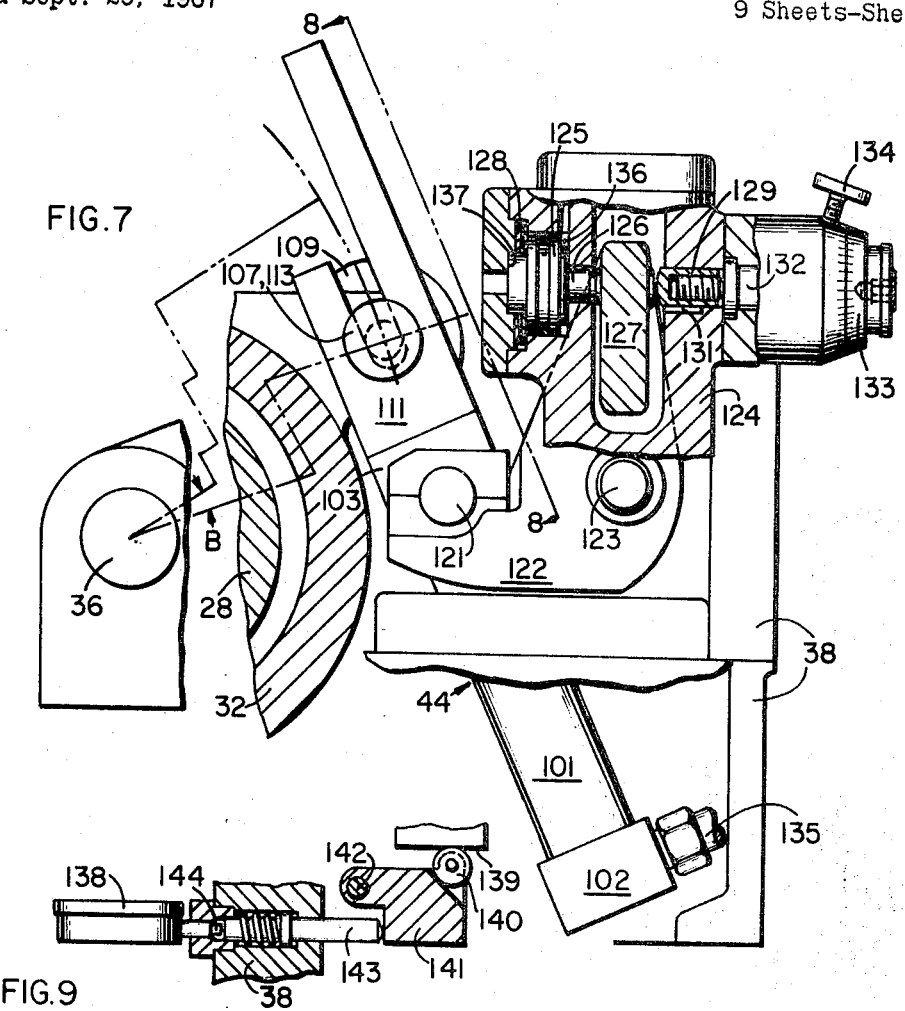
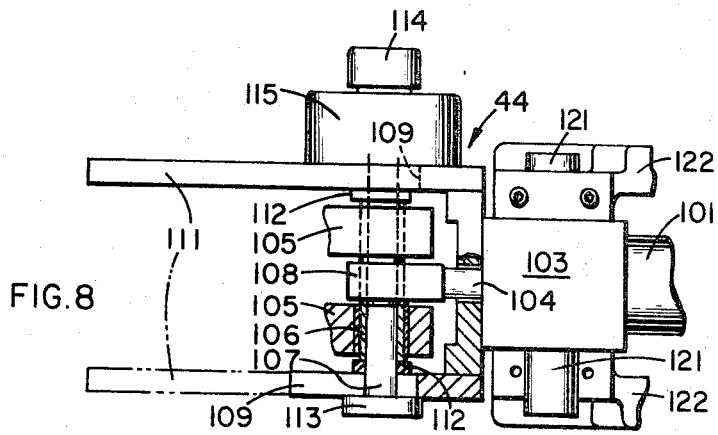

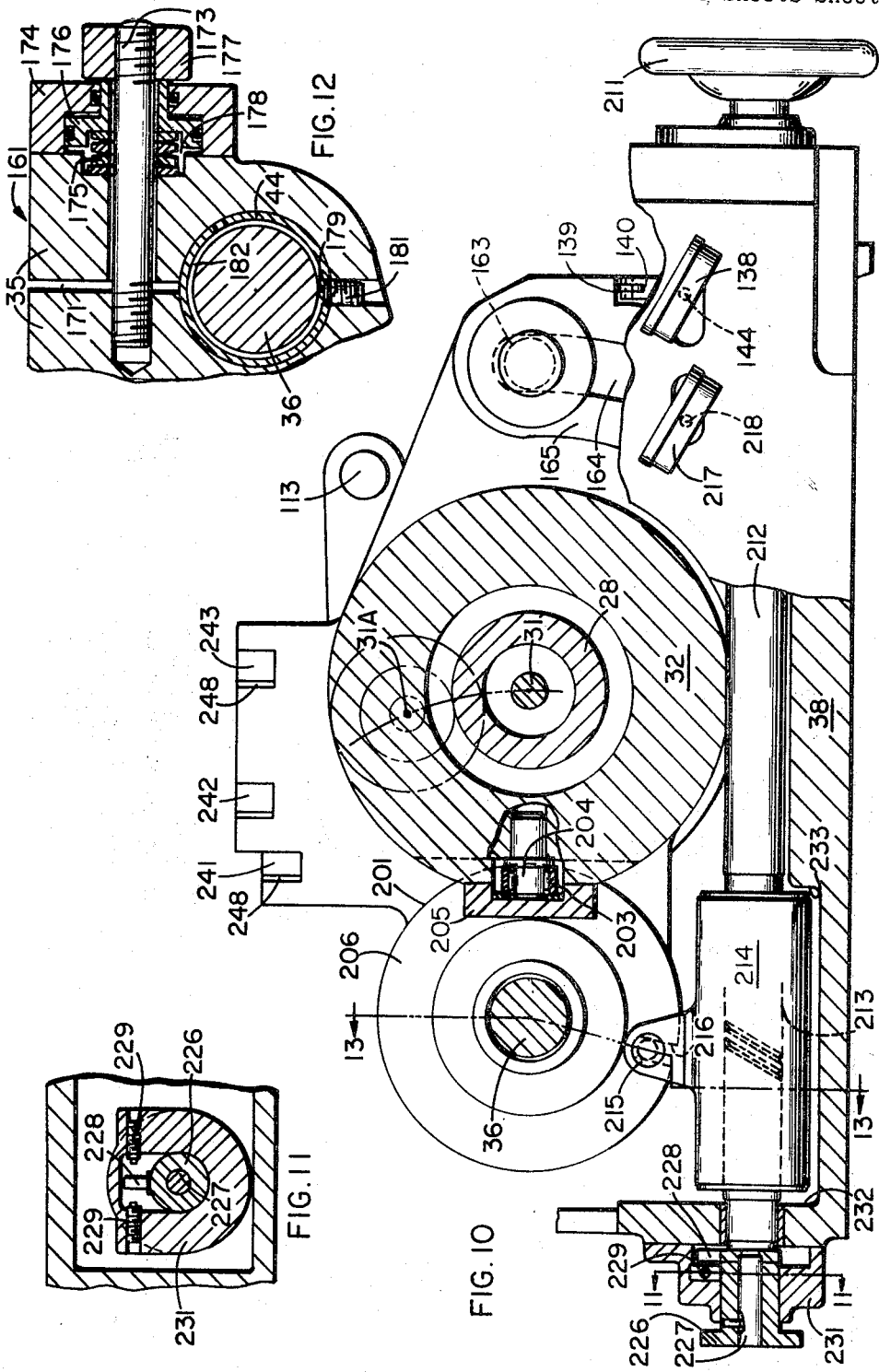

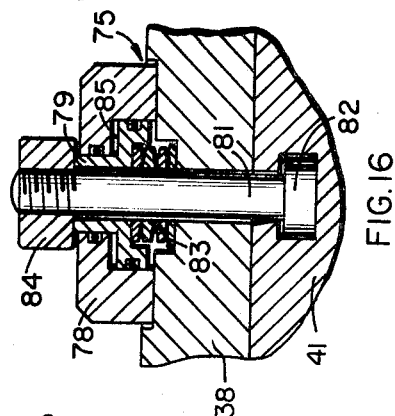

3,528,286
MACHINE FOR RUNNING TOGETHER BEVEL OR HYPOID GEARS
Werner E. Bergemann and Thomas W. Dentinger, Rochester, and Edwin W. Newton, Penfield, N.Y., assignors to The Gleason Works, Rochester, N.Y., a corporation of New York
Filed Sept. 29, 1967, Ser. No. 671,769
Int. Cl. G01m 13/02
U.S. Cl. 73—162                23 Claims

ABSTRACT OF THE DISCLOSURE

Machine for testing pairs of bevel or hypoid gears having a vertical, axially adjustable, spindle for the gear of the pair and a horizontal spindle for the pinion of the pair. The pinion spindle housing is on horizontal slides which are adjustable in the direction of the pinion spindle axis and transversely thereof. The housing is also pivotable about an axis parallel to the spindle axis to carry the pinion between an elevated loading position and a lowered position in which it may run in mesh with the gear. A preselected amount of backlash between the gears is established by elevating the housing, about the same pivot axis, from a fully lowered position in which the gears mesh without backlash. The housing is also movable in the pinion axial direction while the gears are being run together at a selected speed, to find their quietest running position. This search motion is effected either manually or by power operated means. Vibration measuring means sense the quietest position and cause the search motion, when power operated, to stop in this position. During the search the machine components that are movable for purposes of adjustment and backlash setting are rigidly secured together by clamps.

---

The invention relates to machines for running together pairs of bevel or hypoid gears, for the purpose of testing them as to their running qualities, tooth bearing contact and the like, or for smoothing or finishing them by lapping, honing, burnishing or the like. The gears of a pair may both be work gears in the course of manufacture or assembly, or one of them may be such a work gear and its mate a master gear or a gear shaped tool.

One object is a machine configuration such that the spindles carrying the gears are journaled in a rigid and compact machine structure, so as to lessen vibratory displacements of the gears as they are run together. Another object is an arrangement whereby the machine components which are moved relatively, either in the course of setup or adjustment to accommodate gears of a particular size and design, or in the course of moving one spindle from a loading position to a running position, may be rigidly secured together by clamps while the gears are being run, but that one member of the gear pair may be displaced easily in the pinion axial direction, through a small range, for searching out the quietest running position, so that the gears may be assembled in this position in the housing in which they are ultimately to operate.

Another object, for a related aspect of the invention, is a search means including a vibration pick-up and measuring means to determine when the quietest running position is reached, to indicate such position, and, preferably, to stop the search motion when the desired position is reached.

Other objects relate to an improved and simplified arrangement for bringing the pinion spindle from loading position to a running position wherein the gears have a preselected amount of backlash. More specifically, there is an objective to accomplish by motion around a single pivot axis both the large amplitude displacement required to move the pinion spindle from loading to running position, and the small amplitude displacement required to establish backlash between the gears. There is also the objective of providing an automatic means to bring the teeth of the gear and pinion into meshing relation as the pinion is moved from the loading toward the running position.

Figure 1:
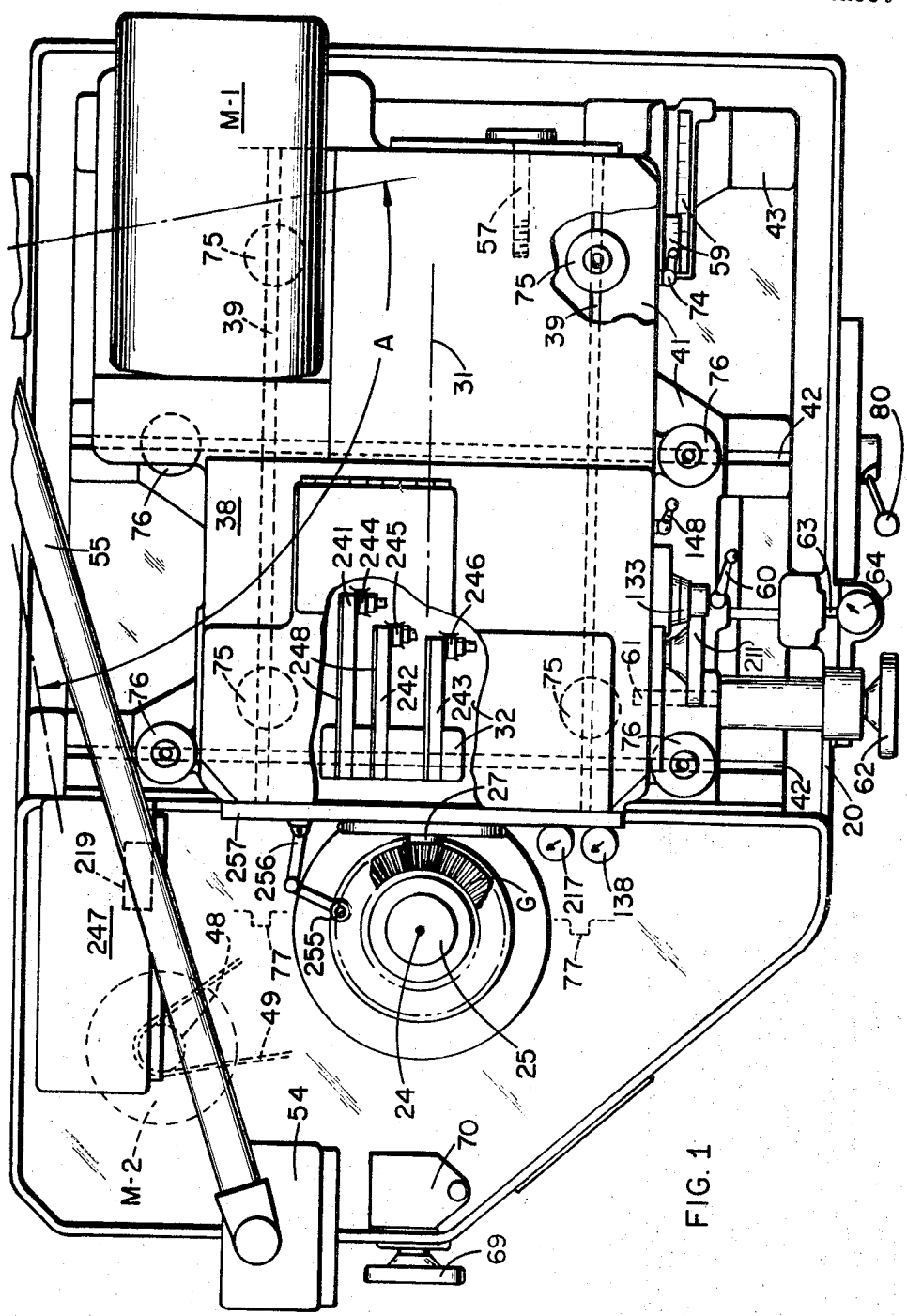
Figure 2:
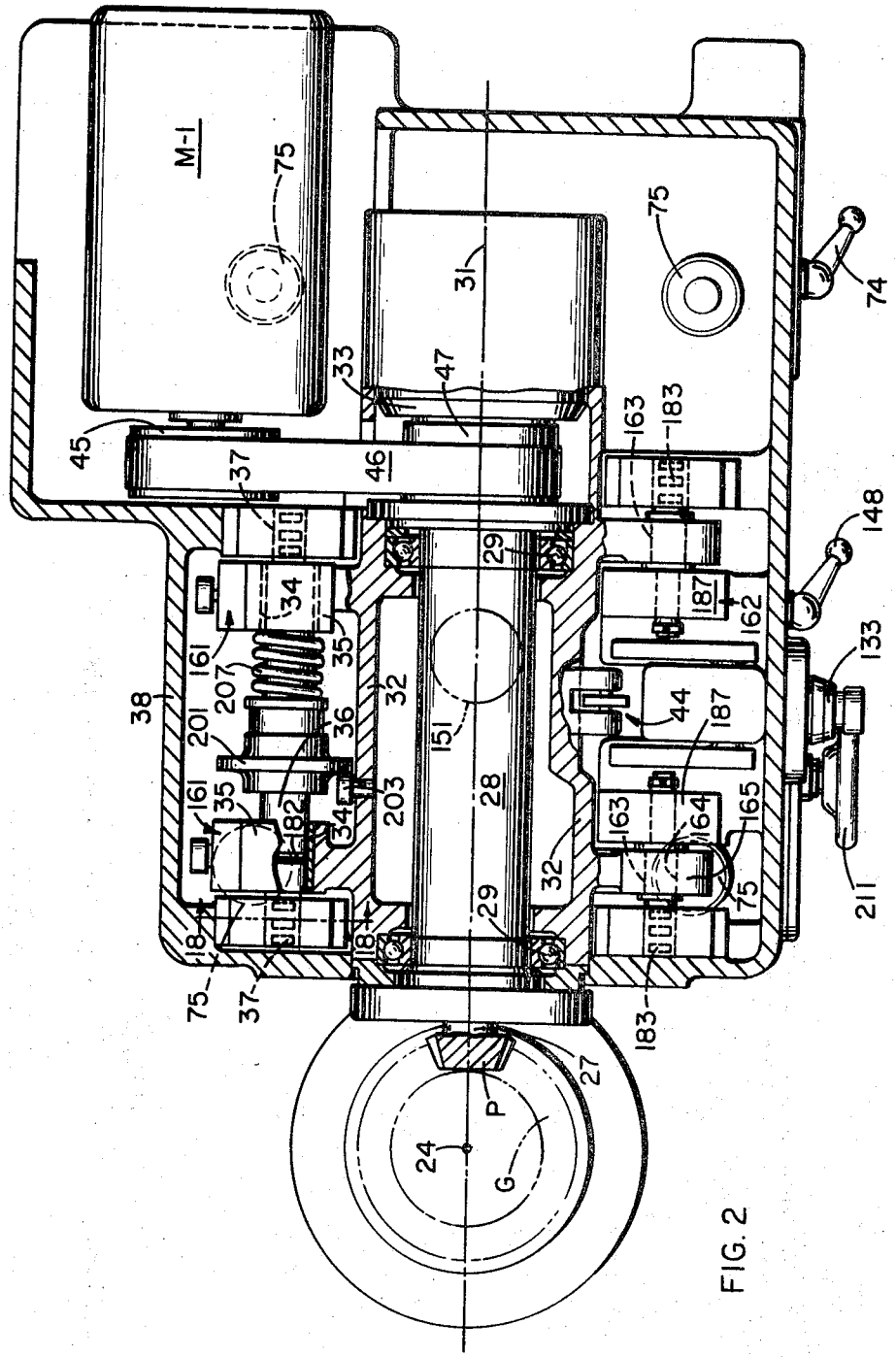
Figure 3:
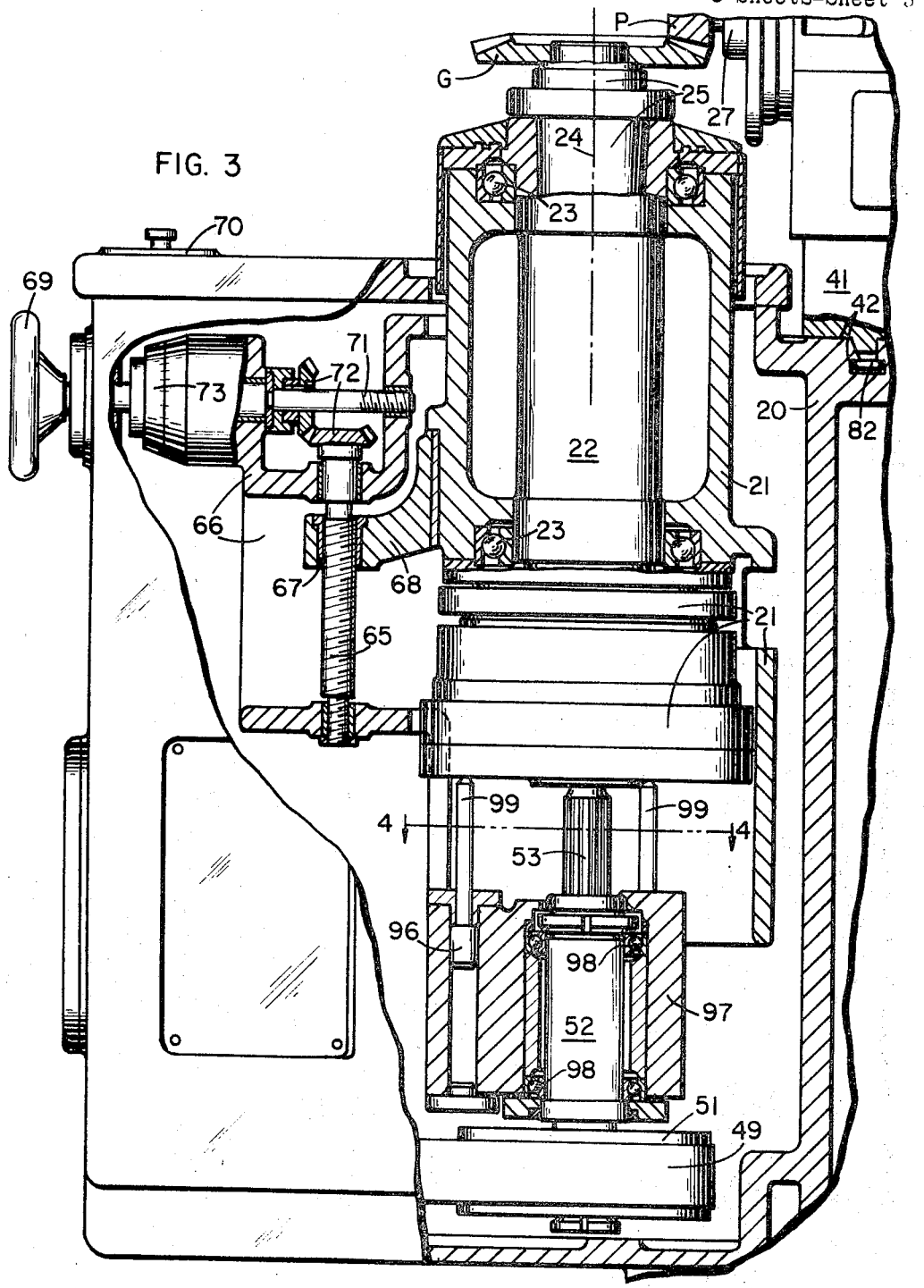
Figure 4:
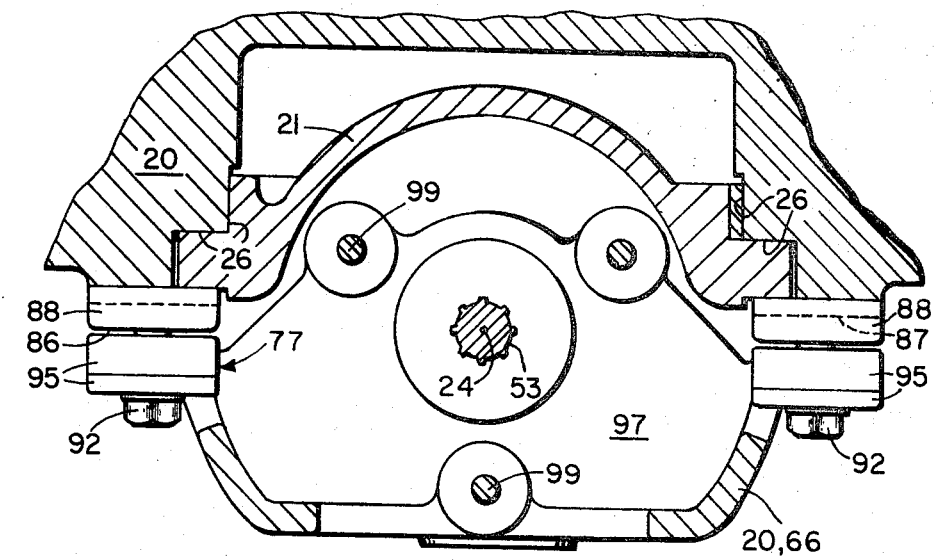
Figure 5:
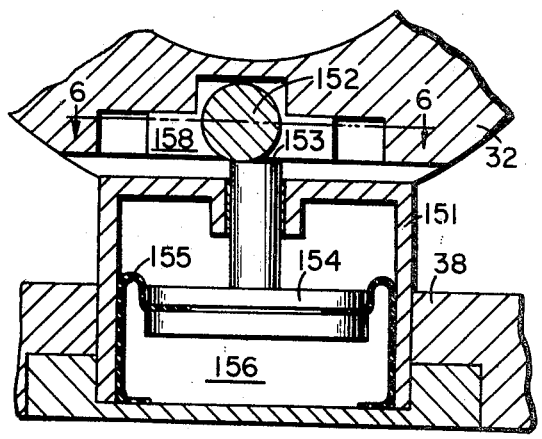
Figure 19:
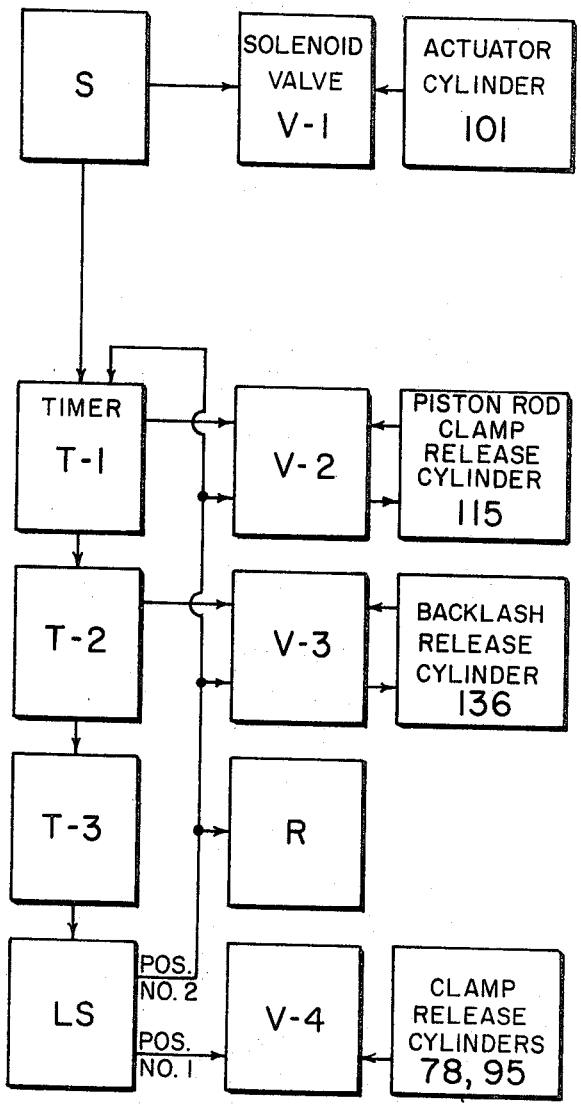
Figure 20:
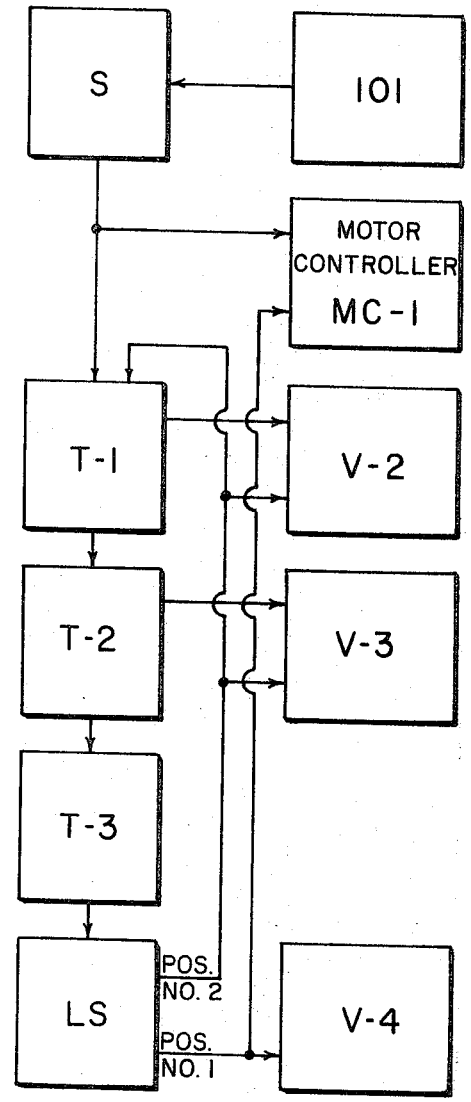
Figure 22:
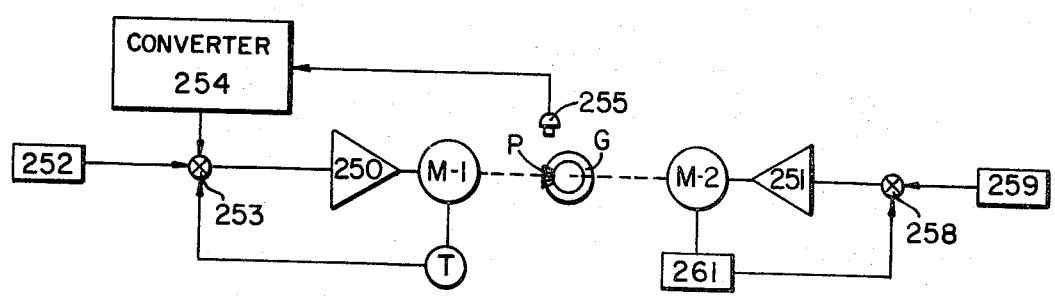
Figure 21:
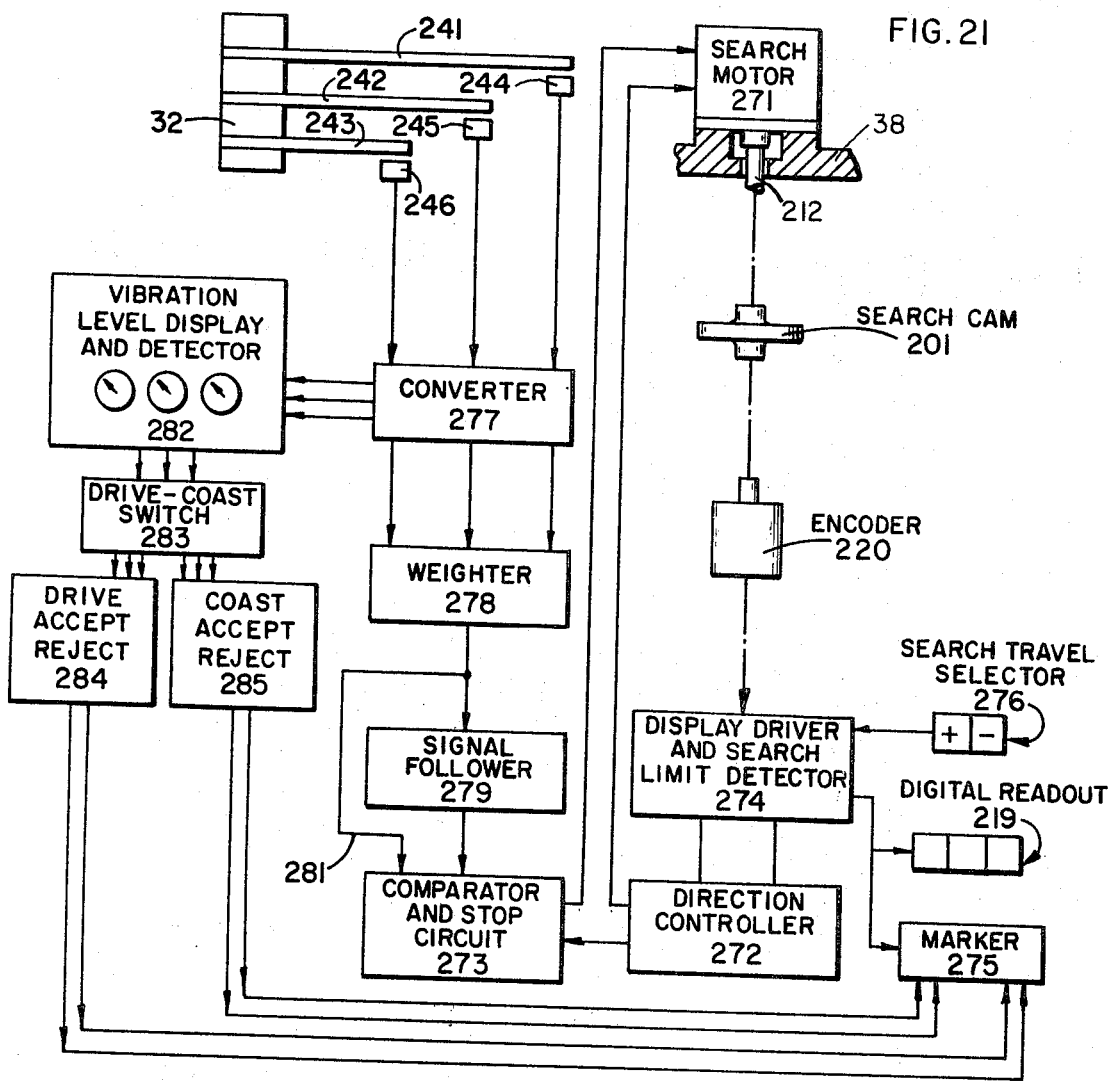

The foregoing and other objects and advantages of the invention will appear from the following description made with reference to the accompanying drawings, wherein:

FIG. 1 is a plan view of the machine;
FIG. 2 is a horizontal section in the plane of the pinion spindle axis;
FIG. 3 is a partial vertical section in the plane of the gear spindle;
FIG. 4 is a horizontal section in plane 4—4 of FIG. 3;
FIG. 5 is a detail vertical section and FIG. 6 a detail section in plane 6—6 of FIG. 5, showing counterbalance means for the pinion spindle housing;
FIG. 7 is a view, partly in vertical section, in a plane transverse of the pinion spindle axis, of the mechanism for operating the pinion spindle housing and establishing backlash;
FIG. 8 is a view of the same mechanism in plane 8—8 of FIG. 7, partly in section in a parallel plane;
FIG. 9 is a detail sectional view of backlash indicating means;
FIG. 10 is a sectional view, transverse of the pinion spindle axis, showing the search mechanism for best pinion running position;
FIG. 11 is a detail section taken in plane 11—11 of FIG. 10;
FIG. 12 is a sectional view through a clamp for the pinion spindle housing;
FIG. 13 is a part sectional view, showing the search mechanism, and taken in plane 13—13 of FIG. 10;
FIGS. 14 and 15, are sectional views of clamps for the gear spindle housing; and FIG. 16 a similar view of a clamp for the horizontal slide supporting the pinion spindle housing;
FIG. 17 is a detail sectional view, in a vertical plane transverse of the pinion spindle axis, of gage positioning means;
FIG. 18 is a detail cross-sectional view in planes 18—18 of FIGS. 2 and 15;
FIG. 19 is a diagram of means for automatically meshing the gears for running together;
FIG. 20 is a diagram illustrating a modification of the system shown in FIG. 19;
FIG. 21 is a view, partly in section and partly in diagram form, of an automatic search system; and
FIG. 22 is a similar view of a motor speed control system.

The illustrated machine is one intended primarily for testing gears. Referring to FIGS. 1, 2 and 3, it comprises a frame 20 supporting a housing 21 in which a spindle 22 for the gear G, the larger member of the pair to be tested, is journaled on ball bearings 23 for rotation about vertical axis 24, the gear being mounted on a suitable workholder 25 on the upper end of the spindle. The housing 21 constitutes a vertical slide which is adjustable along vertical guideways 26 on the frame 20, FIG. 4, to adjust the gear G into proper position for running with its mate pinion, P, the smaller member of the gear pair undergoing test.

Referring primarily to FIG. 2 the pinion P is mounted by means of workholder 27 on one end of spindle 28 which is journaled for rotation on ball bearings 29 about horizontal axis 31 in a housing 32. The workholder 27 is operated to chuck or dechuck the pinion by a hydraulic actuator 33, incorporated in the spindle housing and of the kind disclosed in application Ser. No. 669,948, filed Sept. 22, 1967, by Joseph P. Nardone, of Rochester, N.Y. A generally similar actuator for workholder 25 is provided in spindle 22, FIG. 3. Bushings 34, FIG. 2, in bearing projections 35 of housing 32 support the housing for pivotal motion about a shaft 36 which is parallel to axis 31, the shaft being supported at its ends on bearings 37 mounted in a horizontal slide 38. This slide is adjustable along T-slotted guide ways 39, FIG. 1, parallel to axis 31, in a subjacent horizontal slide 41 which is adjustable along ways 42 and 43 on the frame 20, the ways 42 being T-slotted, as shown in FIG. 3.

By means which include hydraulic actuator 44, FIGS. 2, 7 and 8, the pinion spindle housing 32 is pivoted about shaft 36 between an elevated position wherein the spindle axis 31 is at 31–A, FIG. 10, and a lowered position wherein it is at approximately the same level as the axis of shaft 36. In the elevated position, which is the loading position, the pinion P and gear G may be readily mounted on their respective work-holders; in the lowered position, or running position, the pinion and gear may be run together under suitable brake load. For this purpose a motor M–1, FIG. 2, mounted on slide 38 is connected by drive pulley 45 and belt 46 to driven pulley 47 on the pinion spindle 28. Similarly, referring to FIGS. 1 and 3, a motor M–2 is connected by pulley 48, belt 49 and pulley 51 to a shaft 52 which has a splined connection 53 to gear spindle 22. The motors preferably are of reversible, adjustable speed type, and by their control system, either one may serve as a drive motor and the other as a brake, so that, as has been known heretofore in gear testing machines, either the pinion P may drive the gear G, or vice versa, with a drive torque which is adjustable by the motor control system. Control switches are mounted in a pendant control box 54, FIG. 1, pivoted on a vertical axis to an arm 55 that is above the machine proper and is pivoted to a vertical tubular upright extended from the frame 20 so that the box may be swung through the angle A to any convenient position.

For the purpose of setting up or adjusting the machine to accommodate gears of the various sizes and designs within the capactiy range, the pinion P may be adjusted axially by means of a wrench-operated screw 57, FIG. 1, which when rotated adjusts upper slide 38 upon lower slide 41 in the direction of axis 31. The position of adjustment of slide 38 is shown by cooperating scales 59. The pinion P may be adjusted laterally, to adjust the offset of axis 31 from gear axis 24 by means of screw 61 operated by handwheel 62, the amount of the offset being shown by a gage bar 63, held by a clamp screw 60, and an indicator gage 64. The gear G is adjustable vertically by means of screw 65, FIG. 3, which is rotatable in bracket part 66 of the machine frame and is threaded to a nut 67 carried by arm 68 of the gear spindle housing 21. The screw is rotated by means of a handwheel 69 connected to the screw by shaft 71 and bevel gears 72. The position of adjustment is shown by a graduated dial 73 on shaft 71, which is visible when a pivoted cover 70 above it is raised.

After these adjustments have been made, the relatively adjustable machine parts are rigidly secured to the machine frame by spring-applied, hydraulically-released clamps. Four such clamps 75 controlled by lever 74, FIGS. 1, 2 and 16, secure the slide 38 to slide 41; four similar clamps 76, controlled by lever 80, secure slide 41 to the machine frame 20; and four more, designated 77, FIGS. 1, 4 and 14, and also controlled by a lever (not shown) secure the gear spindle housing 21 to the frame. Referring to FIG. 16, each clamp 75 comprises a cylinder 78 containing a piston 79, a clamp bolt 81 with a head 82 anchored in the T-slot of the slide 41 to which the slide 38 is to be clamped, and a compressed clamp spring 83 acting to press the piston upwardly against a nut 84 screw-threaded to the bolt. Hydraulic pressure applied to the chamber 85 above the piston further compresses the spring and releases the clamping pressure of the piston against nut 84.

Clamps 77, FIGS. 4 and 14, each comprise a stud 86 anchored to frame 20, and a clamp plate 87 movable axially of the stud in a recess in the gib 88 which retains the gear spindle housing 21 against the related vertical guideway 26. The clamp plate is held in the recess by a pin 89 and is pressed against the housing 21 by a clamp spring 91 compressed between a nut 92 adjustably screw-threaded to the outer end of the stud and a piston 93 whose tubular stem extends slidably through gib 88 and bears on the clamp plate. When pressure is applied to chamber 94 of a two-part clamp cylinder 95, the piston acts to further compress spring 91 and release its pressure against clamp plate 87.

To facilitate the vertical adjustment of housing 21 by means of handwheel 69 after clamps 77 have been released, the counterbalancing pressure means shown in FIGS. 3 and 4 are provided to support most of the weight of the housing 21 and spindle 22. These means comprise three hydraulic pistons 96 slidable vertically in cylinders formed in a circle around axis 24 in a block-like part 97 of the machine frame, this part also supporting bearings 98 in which shaft 52 is journaled. The upwardly projecting rods 99 of the pistons abut the lower end face of the gear spindle housing 21, transmitting to it pressure that is applied to the lower faces of the pistons by hydraulic fluid introduced into the cylinder chambers through suitable passages, not shown.

Referring to FIGS. 2, 7 and 8, the hydraulic actuator 44 serves not only to pivot the spindle housing 32 about shaft 36 between loading and running positions, but also serves as a link of the mechanism which is provided to establish backlash between the gears P, G prior to running them. For this purpose the actuator, which includes cylinder body 101 and lower and upper heads 102 and 103, is bodily as well as pivotally movable relative to slide 38. Also in addition to having its piston rod 104 pivoted to spindle housing 32, its upper head 103 is connectible to the housing 32 by the clamp means shown in FIG. 8. Referring to the latter, the housing 32 has spaced integral arms 105 having bushings journaling a sleeve 106 which extends around a pivot and clamp bolt 107. The sleeve also is journaled in the upper end portion 108 of piston rod 104, while the bolt 107 extends through slots 109 in two laterally spaced arms 111 rigidly secured to cylinder head 103. Washers 112 are provided around bolt 107 between the ends of sleeve 106 and arms 111.

The bolt 107 has a head 113 engaging one arm 111 and at its opposite end has a nut 14. Abutting with the other arm 111 is a clamp cylinder 115, similar to cylinder 78, FIG. 16, containing a clamp spring and clamp-release piston which act in the manner of spring 83 and piston 79 in FIG. 16. When hydraulic pressure is applied to release the clamp, the bolt 107 is free to move along slots 109 in response to movement of the piston and rod 104 in cylinder 101; when the pressure is released the bolt is rigidly clamped to the arms. In either case the arms 105 of housing 32 and piston rod end 108 are free to rotate upon and have limited axial motion relative to sleeve 106.

Cylinder head 103 also has trunnions 121 journaled in bifurcations of a lever 122 which is fulcrumed by a pivot pin 123 to a bracket 124 rigidly secured to the upper slide 38. In the bracket there is a hydraulic piston 125 whose stem 126 abuts the web 127 of bifurcated lever 122. A spring 128 back of the piston presses the latter against web 127. A plunger 129 abuttable with the opposite side of the web is slidable in the bracket, and held against rotation therein by key 131. Screw-threaded to the plunger is a shaft 132 that is rotatable in the bracket by means of a graduated backlash setting dial 133 which, after adjustment, is locked by a set screw 134.

While the gear and pinions G and P are being mounted the pinion spindle housing is held in its upper limit position by hydraulic pressure applied to cylinder 101 through flexible conduit 135 connected to the lower cylinder head 102. Thus the piston rod 104 is held in its upper limit position wherein pivot bolt 107 is elevated through angle B from its lower limit position shown in FIG. 7. Hydraulic pressure is applied to clamp cylinder 115 so that bolt 107 is unclamped from arms 111 of the cylinder and has been free to pass out of the upper ends of guide slots 109. Hydraulic pressure is also being applied to cylinder chamber 136, for piston 125, so that latter has further compressed spring 128 and retracted the piston to the limit position wherein it abuts the cylinder head at 137. The weight of the pinion spindle 28 and housing 32 holds the lever web 127 away from plunger 129 by a distance which is selected by adjustment of dial 133.

To lower the spindle housing the conduit 135 is placed on exhaust so that the piston rod 104 lowers under the weight of the spindle and its housing 32, until the pinion P comes into metal-to-metal or no-backlash mesh with gear G. To establish backlash the hydraulic pressure to clamp cylinder 115 is released, followed by release of pressure to cylinder chamber 136. As a result cylinder arms 111 are clamped to bolt 107 and the spring 128 acts to move piston 125 and lever web 127 to bring the latter into abutment with plunger 129. The lever, moved clockwise in FIG. 7, lifts the cylinder 101 and the pinion spindle housing 32 to establish the selected backlash with which the gears P, G may then be run under brake load by motors M–1, M–2. After such running hydraulic pressure is applied in sequence to clamp cylinder 115, cylinder 101 and cylinder chamber 136, resulting in return of the spindle housing 32 to its elevated or loading position.

An indicator gate 138, FIGS. 1 and 9, shows the amount of departure of the test pinion P from its theoretical design position, relative to the test gear G in the direction in which backlash is established, i.e., in the direction of the gear axis. Thus the gage, if first "zeroed" when master gears are mounted with correct backlash, will when read after the backlash mechanism shown in FIG. 7 has operated with the gears installed, show the distance by which the test gear G should be adjusted along its axis, by means of shims or the like, when it is being finally assembled with its mate pinion. The gage is operated by abutment of a horizontal surface 139 of the pinion spindle housing 32, FIGS. 9 and 10, with a roller 140 carried by a lever 141 which is fulcrumed by pin 142 to slide 38. The lever abuts a spring backed plunger 143 which is slidable in slide 38 and abuts the actuating stem 144 of the gage when the housing 32 is lowered.

When the backlash establishing mechanism is not used, as for example while the machine is being gaged to bring the gear and spindle axes to a particular relation, or when the pinion P is to be brought to a selected running position relative to the gear G irrespective of backlash, the horizontal face of an abutment 145, FIG. 17, on the pinion spindle housing 32 engages a stop roller 146 when the housing is lowered by release of pressure to actuator cylinder 101. This roller is eccentrically mounted on a shaft 147 rotatable through 180° in horizontal slide 38 by means of a lever 148, FIG. 1. When the shaft is rotated 180° from the position shown in FIG. 17, the roller is thereby lowered to the position indicated in broken lines, wherein it is clear of the abutment 145 throughout the backlash establishing procedure previously described. The lever 148 is held to maintain roller 146 in either its up or down position by detent means, not shown.

Figure 6:
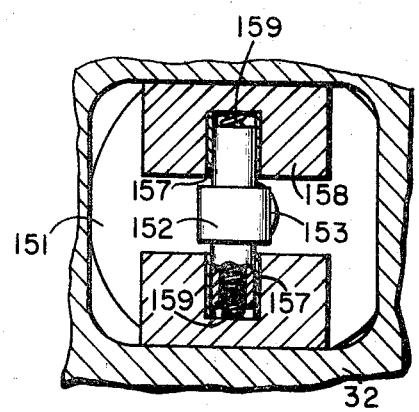

In order to avoid possible damage to the gears when in metal-to-metal contact by reason of the weight of the spindle housing 32, the counterbalance shown in FIGS. 5 and 6 is provided. It consists of an air cylinder 151 on the horizontal slide 38 beneath the housing and a roller 152 carried by the housing and engageable with the upper end face 153 of the stem of piston 154 during the latter portion only of the housing's down motion, while the gears are approaching or are in mesh. The cylinder is preferably of the type whose piston is sealed to the cylinder wall by a flexible sleeve 155. Air is applied to the lower chamber 156 of the cylinder at a controlled pressure such that the gears G, P, when in metal-to-metal contact, and with no pressure in cylinder 101, have to bear only a minor portion of the weight of the housing 32 and spindle 28. The roller 152 is journaled for rotation and limited axial motion in low-friction bushings 157 in bearing blocks 158 secured rigidly in a recess in the bottom of housing 32. Light springs 159 retained in bores in the journal portions of the roller serve to center the roller between the two bearing blocks each time the housing 32 is elevated to lift the roller from face 153 of the piston stem.

While the gears G, P are being run together, either with backlash established by the mechanism shown in FIG. 7, or with the pinion spindle housing 32 positioned by abutment 145 engaging roller 146, FIG. 17, the spindle housing is rigidly secured to shaft 36, FIG. 2, by two spring-applied hydraulically pressure released clamps 161 shown in detail in FIG. 12, and is also rigidly secured by clamps 162 shown in detail in FIG. 15, to two axially aligned stub shafts 163 located on the side of the spindle opposite to the shaft 36. As shown in FIGS. 2 and 10 the shafts 163 extend through arcuate slots 164 in flanges 165 of the spindle housing. The slots 164 are curved about the axis of shaft 36 and so do not interfere with pivotal motion of the housing about the shaft 36 when clamps 161 and 162 are released.

Referring to FIG. 12, each bearing projection 35 is split, as indicated at 171 and the bushing 44 supported by it is also split. A stud 173 is anchored to the proximal part of projection 35 and extends through the cylinder portion 174 of clamp 161 which is secured to the distal part of the projection. Spring 175 presses a piston 176 in the cylinder against nut 177 on the stud to clamp the split bearing projection and bushing 44 to the shaft; by application of hydraulic pressure to cylinder chamber 178 the clamping pressure of the spring is released. A ball key 179 carried by plug 181 screw threaded to each projection 35 engages in a groove 182 around the shaft (see also FIG. 2) to hold the spindle housing 32 against relative displacement axially of the shaft.

Referring to FIG. 2, the shafts 163 are supported at one end by bearings 183 on slide 38 which are essentially like bearings 37 for shaft 36, and at the opposite end by bearing means associated with the clamps 162, which also are mounted on slide 38. As shown in FIG. 15, each clamp 162 comprises rigidly connected cylinder sections 184 in which the shaft 163 is mounted for limited axial motion. The cylinder is supported for limited axial motion on a ball-sleeve bearing 185 mounted in sleeve 186 in bearing block 187 secured to slide 38. In the absence of hydraulic pressure in cylinder chamber 188, clamp spring 189 presses piston 191 against nut 192 on the shaft, to thereby clamp flange 165 of spindle housing 32 between washer 193 and shoulder 194 of the shaft.

Hydraulic pressure is applied to clamps 161 and 162 to release them when the spindle housing 32 is to be pivoted about shaft 36, either by actuator 44 or by the backlash control means 125, 128, FIG. 7. The hydraulic pressure is released to apply the clamps and thus secure the pinion spindle housing 32 rigidly to shafts 36 and 163 before the gears G, P are run together. With the clamps applied and with the gears running together the spindle housing and shafts are movable as a unit in bearings 37 and 183, in the pinion axial direction, for testing the range of axial adjustment of the pinion, and especially for determining the best running position of the pinion. For this purpose the ends of shafts 36 and 163 in bearings 37 and 183 are provided, as shown in FIG. 18, with horizontal and oppositely inclined flats respectively engaging linear roller bearings 195 and 196. The inclined rollers 196, rolling on plane ways in the lower section 197 of the bearing block, bear the weight of the spindle and spindle housing assembly 28, 32; the horizontal rollers, rolling on a plane way in the upper section 198 of the bearing block closely confine the shaft 36 or 163, preferably exerting a slight downward pressure upon it.

For moving the pinion housing back and forth on bearings 37, 183, in the search operation, a face cam 201, FIGS. 2, 10 and 13, is journaled on a bracket of slide 38 on roller bearings 202 which are coaxial of shaft 36. A follower roller 203, journaled on needle bearings on a stud 204 secured to the pinion spindle housing 32, and retained by a plate 205 on the housing, is held against face 206 of the cam by a compressed spring 207 which acts between part 208 of slide 38 and the right bearing projection 35 (in FIG. 2) of spindle housing 32. An anti-friction bearing 209 is interposed between the projection 35 and the spring. The face 206 is a helical surface of such pitch that rotation of the cam through about twenty-seven degrees to either side of a central position shifts the spindle housing axially by about 0.100 inch. The cam is operable manually by a handwheel 211 secured to a shaft 212 journaled in the slide 38 and having a screw portion 213 upon which a ball nut 214 has screw threaded engagement. The nut carries a pin 215 engaged in radial slot 216 of the cam. Accordingly by turning the handwheel 211 back and forth, the nut 214 may be reciprocated axially of shaft 212 and the cam 201 is rocked about shaft 36, causing the pinion spindle housing 32 and the pinion P to be reciprocated axially in search of the quietest running position. A dial type indicator gage 217, FIGS. 1 and 10, mounted on the slide 38 has its actuating stem 218 in abutment with housing 32, so that the operator can determine the position of the housing relative to a "zero" or search start position, in which the gears run most quietly. This information serves to indicate the position in which the pinion should be adjusted in final assembly with its mate gear, such adjustment usually being made by means of shims of different thickness.

Alternatively the operator may read the shim thickness directly on a digital readout device 219, FIG. 1, mounted in a display panel on the machine frame, and operated electrically by a positive digital encoder 220, FIG. 13. The devices 219, 220 may be of a conventional construction which is not a part of the present invention. The operating shaft of the encoder is geared to the cam 201, by a train comprising a gear sector 221 secured to the cam, a pinion 222 meshing with the sector and secured to a shaft 223 journaled on needle bearings in slide 38, and a gear 224 also secured on shaft 223 and meshing with a gear 225 on the digital encoder shaft. The gears 224, 225 are preferably of such ratio that the digits displayed correspond to thickness of the available shims for the pinions P. For example if the shim thicknesses vary by increments of 0.001 inch, the digits displayed by the readout device 219, in accordance with signals from the encoder 220, should correspond to increments of one-thousandth of an inch in the axial displacement of the pinion P effected by the cam 201; while if the shim thickness varies by 0.01 mm., the readout should be in digits representing pinion axial motions in corresponding increments.

For adjustably limiting the search travel, a knob 226, FIGS. 10 and 11, is keyed to an extension 227 of shaft 212 for limited axial motion thereon. The knob carries a finger 228 adapted to abut adjusting screws 229 threaded into part 231 of the slide 38 when the knob is in its left position (in FIG. 10) wherein the finger lies in plane 11—11. In the testing of like gears of a production series, the travel may thus be limited to the range known to be suitable for mounting the pinions P in final assembly with their mate gears. However by moving the knob to its right position, in which it is shown in FIG. 10, the travel may be through the substantially greater range limited by abutment of ball nut 214 with surfaces 232 and 233 of slide 38.

With the machine in a reasonably quiet environment it is possible for a skilled operator having discerning hearing to determine with good accuracy the best running position of the gears G, P. However the machine in its preferred form includes vibration sensing means to perform this function. These means include thin steel bars 241, 242 and 243, constituting vibratory reeds, anchored at one end in slots provided in the pinion spindle housing 32, and electro-magnetic vibration measuring pick-ups 244, 245 and 246 adjacent the distal ends of the respective reeds and also mounted on the housing 32. Reed 241 is made to have a natural frequency of vibration (of about 250 vibrations per second in this particular machine) corresponding to the mesh frequency of an average pair of automobile drive gears when the pinion is driven at about 1,000 r.p.m.; the reeds 242 and 243 have natural frequencies corresponding to the second and third harmonics of the mesh frequency. The electrical outputs of the pick-ups are amplified and their magnitudes shown by suitable meters 282, FIG. 21, also mounted in display panel 247, FIG. 1. Strips 248 of a visco-elastic damping material are adhered to the bars 241–243 so that the amplitude of their vibrations will vary substantially in response to different intensities of the vibrations transmitted by gears G, P of different quality. The sensing means require that the control system for motors M–1, M–2 be of a type providing accurate and adjustable speed control for whichever motor is driving, and accurate control of the brake load provided by the other motor.

In a preferred control system, shown diagrammatically in FIG. 22, the motors M–1 and M–2 are variable speed direct current motors respectively controlled by speed regulators 250 and torque regulator 251. The speed of the motor M–1 which will provide a tooth mesh frequency of gears G, P that corresponds to the natural frequency of reed 241, is set by means of a manually adjustable potentiometer 252 which applies a voltage to summing point 253. For applying a feed-back voltage to this point a tachometer generator T is provided which is driven mechanically by motor M–1. The voltage summed at 253 is applied as an input speed control signal to regulator 250, causing the latter to maintain the mesh frequency at or very near the selected value.

Alternatively, the tachometer feed-back is disconnected, and the feed-back is provided by connecting to the summing point 253 a frequency-to-analog converter 254 which receives the output of a proximity pick-up 255, which in this instance is of the electro-magnetic type. This pick-up, mounted on an adjustable arm 256 on guide bar 257, FIG. 1, on slide 38, is positioned sufficiently close to either gear G or pinion P under test that the teeth passing by it, which of course will pass at the mesh frequency, cause it to generate and transmit to the converter 254 a corresponding electrical frequency. In this case also, the voltage summed at 253 is applied as an input speed control signal to regulator 250, causing the latter to maintain the mesh frequency at the selected value, within very close limits. This alternative feed-back has the advantage that it automatically maintains speed control irrespective of the tooth number ratio of the particular gear and pinion G, P, being run on the machine. The speed regulator reference, 252, is set once for the desired mesh frequency, in this case for the fundamental frequency of reed 241. Thereafter gears of any number of teeth will be run at the corresponding mesh frequency.

The input control signal to torque regulator 251 for motor M–2 is the voltage, summed at point 258, of potentials applied by a manually adjustable torque control potentiometer 259 and by torque transducer 261. The latter, provided in the mounting of motor M–2, reflects the reaction torque of the motor against the part of frame 20 which supports it. The system is such that the drive torque load on tests gears P, G is maintained substantially constant at the value selected by adjustment of potentiometer 259. Also by selection of the output of this potentiometer, the torque load applied by motor M–2 may be made either positive or negative, so that the load on the gears may be reversed without reversing their direction of rotation. Thus, for testing the drive side of the gear teeth the motor M–2 is made a generator applying a torque to gear G resisting its rotation and motor M–1 being the driver; for testing the coast side of the teeth the motor M–2 is made the driver of gear G and the motor M–1 becomes a generator braking rotation of pinion P.

The pinion spindle housing actuating and backlash establishing mechanism illustrated primarily in FIGS. 7 and 8 may be operated by suitable semiautomatic means, of the general kind heretofore used, by which a pinion P is quickly advanced from loading to near-meshing position and then, while being slowly jogged into full mesh position, is manually rotated to align its teeth with the tooth slots of gear G. The present machine, however, also provides means to effect such meshing automatically. As shown schematically in FIG. 19 these means include start push button switch S, a limit switch LS supported by slide 38 and actuated by housing 32 when the gears are in mesh to slightly less depth than after running backlash has been established. The automatic means also include solenoid operated valves V–1 to V–4 which controls the application hydraulic pressure from a suitable source respectively to cylinder 101, piston rod clamp release cylinder 115, backlash release cylinder 136, and clamp-release cylinders 78 and 95, FIGS. 16 and 14. Also included is a circuit R which when energized causes the pinion drive motor M–1 to be energized for a short time to "jog" the pinion to a different position; and timers (timing relays) T–1, T–2 and T–3. Timer T–1 is set to time out, after being energized, in the maximum time required for the pinion to lower from loading position to full depth mesh with the gear; and timer T–2 and T–3 are both set to time out a small fraction of a second after their energization.

With the gears G and P mounted on the machine the switch S is closed, energizing timer T–1 and operating solenoid valve V–1 to place cylinder 101, FIG. 7, on exhaust, thus allowing the pinion spindle housing 32 to lower by gravity. When timer T–1 times out, timer T–2 is energized and solenoid valve V–2 is operated to release pressure from clamp-release cylinder 115, thereby clamping the piston rod pivot pin 107, FIG. 8, to arms 111 of cylinder 101. Then timer T–2 energizes timer T–3 and operates solenoid valve V–3 to release pressure from backlash release cylinder 136, effecting backlash-applying motion of lever 122, FIG. 7. If, by time the timer T–3 times out the pinion has lowered into mesh with the gear G, the switch LS is in position No. 1 thereof in which it operates solenoid valve V–4 to release pressure from clamp cylinders 78 and 95, thus clamping the pinion spindle housing to shafts 36 and 163, FIG. 2, and the machine is ready to run. The form of the typical gear and pinion teeth is such that probability greatly favors meshing taking place on the first try. However, if it does not, and the pinion P instead stops against the tops of the teeth of gear G, then the backlash applying motion of lever 122 will lift the pinion away from the gear; limit switch LS will be in position No. 2 thereof, so that the energization of circuit R upon timing out of timer T–3 will jog the motor M–1, rotating the pinion to another position. Also valves V–2 and V–3 will be operated to apply pressure to cylinders 115 and 136 and timer T–1 will be reenergized, starting anew the part of the cycle initiated by it, described above. Hence this part of the cycle will be rapidly repeated until the pinion has meshed the gear.

The means just described may be employed whether or not the motor M–1 is of an adjustable speed type. In instances where it is of this type, meshing on fewer tries (on average) may be effected by modifying the system as shown in FIG. 20 to eliminate circuit R and to provide that the closing of switch S will cause the motor's speed controller MC–1 to operate the motor at slow speed, to rotate the pinion at a similarly low speed, on the order of twelve revolutions per minute. This has been found to result in automotive type pinions meshing with their mate gears on the first attempt in nearly all instances. If meshing occurs, the switch LS then in position No. 1 causes controller MC–1 to stop operation of the motor and pressure is released by valve V–4 from clamp cylinders 78, 95. If the gears should fail to mesh so that switch LS is in position No. 2, then just as in FIG. 19, the valves V–2 and V–3 operate to apply pressure to cylinders 115 and 136, and timer T–1 is reenergized. Thus part of the cycle controlled by timer T–1 will be repeated until meshing has occurred.

It should be appreciated that the just-described automatic meshing operation does not necessitate any special handling of the workpieces by the operator. In the elevated loading position of spindle housing 32 (when spindle axis 31 is at 31–A, FIG. 10), the respective workholders may be readily loaded since they are separated sufficiently to assure that the gear pair will not engage each other regardless of their angular orientation, and the automatic meshing operation does not require that the gears being tested be angularly oriented in any particular position at the time they are mounted on their respective spindles.

The search operation which may be made manually by rotating handwheel 211, may be made automatically by modifying the machine as shown in FIG. 21. For this purpose the part 231, knob 226 and shaft extension 227, FIG. 10, are replaced by a reversing motor 271, FIG. 21, mounted on slide 38 and coupled to the shaft 212 for rotating the latter back and forth and thereby operating the search cam 201 and encoder 220.

Motor 271 is reversed by a controller 272 and is stopped by a comparator and stop circuit 273. In testing a pair of gears the motor first moves the pinion axially from one end of a preselected search zone (called the positive end) to the opposite or negative end, while the mesh frequency of the gears is maintained constant at the natural frequency of reed 241 and while signals from the reeds 241–243 are being measured. As the search motion proceeds from the positive end toward the theoretical or design running position of the gears, the signal amplitude will decrease to a minimum at the best running position and then increase as the negative end is approached. Upon reversal of the motor by controller 272 the search motion will proceed to the point of minimum signal amplitude, at which the circuit 273 will stop the motor. The relative position of the pinion at this time will be displayed by the digital readout display device 219. Ordinarily the search will be conducted only on the drive side of the gears. The gear drive system will then effect reversal of drive torque, as previously described, and a test is made as to acceptability of coast side running quality of the gears with the pinion in the position found best by the drive side search. When this testing is completed the controller 272 will continue the pinion travel to the positive end, where it will stop the motor 271 in condition for immediate reversal and search travel toward the negative end at the start of testing the next pair of gears.

The controller 272 is operated to effect motor reversal by positive limit and negative limit signals received from a display driver and search limit detector 274 which receives from encoder 220 (see also FIG. 13) signals indicating the axial position of the pinion throughout the search operation. The output of the driver-detector 274 operates the digital readout display device 219 (see also FIG. 1) which preferably shows the pinion position in terms of mounting shim thickness. The driver-detector 274 may also operate a suitable marking device 275 which may stamp the postion, also preferably in terms of shim thickness, on a tag or other surface which will accompany the test gears to the place of final assembly, or place of rework in case the test shows the gears to be unacceptable. The driver-detector 274 is adjustable, as to the positive and negative limit positions of search travel, by a manually operable travel selector 276. When the limit positions thus selected are reached, the driver-detector so signals the controller 272 which thereupon reverses the motor 271. When the negative limit position is reached, the driver-detector signals this also to the comparator and stop circuit 273.

This latter circuit is controlled also by signals emanating from the reed vibration pick-ups 244–246. These signals are fed to a converter 277 which applies voltages representing the amplitudes of the signals to a weighter 278. This device is adjustable to combine the three voltages in any manually selected proportion into a single voltage which is applied to a signal follower 279. The purpose of the weighter is to give effect, in judging the quality of gears G, P, to the relative importance of the fundamental vibration and the second and third harmonics thereof. If only the fundamental is important then the weighter is so adjusted that its output reflects only the value of the converted signal from pick-up 244; if the three harmonics are of equal importance, the weighter will be adjusted to average the converted signals from the three pick-ups 244–246.

Signal follower 279 (essentially a null detector) follows only signals of decreasing amplitude; as the signal level applied by the weighter subsequently increases as the search travel proceeds toward its negative limit, the minimum value is retained and is applied to the comparator and stop circuit 273. When the negative limit position has been reached, so that the search travel is reversed, and this signaled from controller 272 to the circuit 273, the latter compares the minimum value with the signal being received by it directly from the weighter 278 through connection 281. When equality is reached, establishing that the pinion is again in the position of lowest vibration level, circuit 273 stops motor 271. The pinion position will be shown by the digital display 219 and recorded by the marker 275.

The three signal outputs of converter 277 also pass to a vibration level display and detector unit 282, also mounted in panel 247, FIG. 1. Unit 282 includes meters which provide continuous visual indications of the amplitudes of vibration of the reeds 214–243. The unit 282 transmits corresponding signals through switch 283 to accept-reject devices 284 and 285 which are provided respectively for drive side and coast side operation. Switch 283 determines whether the signals from unit 282 pass to device 284 or to device 285. These devices compare the intensities of the incoming signals with the maximum acceptable intensities of the three harmonics for which they (284, 285) are manually adjusted. The devices 284, 285 transmit to the marker 275, for recording by the latter, the fact of whether the three vibrations are all of acceptable level or are not. The switch 283 is so controlled that the accept or reject signal from devices 284, 285 is recorded by marker 275 after the search motion has stopped, and while the gears are therefore operating with the pinion in its axial position found by the search.

Having now described a preferred embodiment of our invention, what we claim is:

1. A machine for running together a pair of bevel or hypoid gears, comprising a frame, a first spindle journaled for rotation on the frame about a vertical axis, said spindle being adapted for supporting on its upper end one member of a gear pair, a second spindle, for supporting the other member of the pair, journaled for rotation about a horizontal axis upon the upper one of a pair of horizontal slides superimposed on the frame, one of said slides being adjustable relative to the frame in the direction of the axis of the second spindle and the other one of said slides being adjustable relative to the frame in the horizontal direction perpendicular to the last-mentioned axis.

2. A machine according to claim 1 in which the first spindle is journaled for rotation in a spindle housing that is adjustable vertically on the frame.

3. A machine according to claim 1 in which the second spindle is journaled in a second spindle housing which is mounted for angular movement on said upper one of the horizontal slides about a pivot axis parallel to and spaced horizontally from said horizontal axis, to carry the second spindle between an elevated gear loading position and a lowered gear running position.

4. A machine according to claim 3 in which said pivot axis is on substantially the same level as the horizontal spindle axis in said running position.

5. A machine according to claim 3 in which there are clamps for securing said slides and the first spindle housing to the frame, and means operative while said clamps are applied, and the spindles are being rotated, for moving the second spindle housing along its spindle axis.

6. A machine according to claim 5 in which there are members on both sides of said second spindle for supporting the second spindle housing, the latter being pivoted to one of said members for said angular movement thereof, clamps for securing the second spindle housing to said members, and bearings supporting said members for movement on the upper one of said slides to carry said second spindle housing during its motion along its spindle axis.

7. A machine according to claim 6 having means to drive one spindle at constant speed and to brake the other spindle with constant brake torque, means to effect said movement of said second spindle housing along its spindle axis, and means to indicate the amplitude of vibration induced by running of the gears.

8. A machine according to claim 7 in which there is a motor to effect said movement of the second spindle housing within a selected range, and means to stop the motor operation of the spindle housing when the latter is in the position within said range in which the amplitude of vibration is minimum.

9. In a machine for running together a pair of bevel or hypoid gears including means for driving one of the gears at a substantially constant speed and for applying a brake load to the other one thereof, means supporting the pinion member of the pair for axial motion while so running in mesh with its mate gear, the improvement comprising: means for measuring the amplitude of vibration induced by the running gears during such axial motion, and means for indicating the relative position of the pinion member, within the range of said axial motion, in which the amplitude of said vibartion is minimum.

10. A machine according to claim 9 in which there is a motor for effecting such axial motion and means for stopping said motor when the pinion member is in the position of axial motion in which said amplitude of vibration is minimum.

11. A machine according to claim 9 in which said means for driving one of the gears at a substantially constant speed comprises a variable speed motor and a speed regulator for said motor including feed-back means comprising a signal generator disposed adjacent the teeth of one gear and adapted to generate a signal having a frequency corresponding to the frequency with which the teeth move therepast.

12. A machine for running together a pair of gears, comprising: a frame supporting housings in which spindles for mounting the gears are journaled; actuating means for moving one housing on the frame to carry its spindle between a loading position, in which mounted gear pairs remain totally disengaged from each other in all relative angular orientations, and a running position, in which mounted gear pairs may be run together in mesh; and means for rotating one spindle at low speed while said one housing is being moved from the loading position toward running position.

13. A machine according to claim 12 having means to move said one spindle to separate said gears should they contact without meshing, and then to repeat motion toward the running position.

14. A machine according to claim 12 in which said means include a switch to determine whether the gears are in mesh and a timer associated with said switch to determine whether the gears have contacted without meshing.

15. A machine for running together a pair of gears, comprising a frame supporting housings in which spindles for the gears are journaled, actuating means for moving one housing on the frame to carry its spindle between a loading position and a running position, motor for driving one spindle, and means operative should the gears contact without meshing during movement of said one housing toward running position to (a) reverse the movement, (b) jog the motor to rotate the gear on said one spindle to a different position, and (c) resume said movement toward running position.

16. A machine for running together a pair of gears comprising a horizontal spindle for one of the gears journaled in a housing which is pivoted for movement about an axis parallel to the spindle axis between an elevated gear loading position of a lowered position wherein the gears are in mesh, the spindle axis when lowered being at substantially the same level as the pivot axis, an actuator for elevating said housing and permitting it to lower by gravity, and counterbalancing means for the housing to lessen the load on the gears when they are in contact.

17. A machine according to claim 16 in which said counterbalancing means comprises a fluid pressure cylinder and piston device arranged to partially support the housing.

18. A machine according to claim 17 in which said device is arranged to act only during the terminal phase of the downward motion of the housing, to lessen the load on the gears when in contact.

19. A machine for running together pairs of bevel or hypoid gears comprising a frame supporting a spindle for the gear or larger member of a pair, a housing supporting a spindle for the pinion or smaller member of the pair, said housing being mounted for pivotal movement relative to the frame about a pivot axis parallel to the pinion spindle to carry the pinion between a position wherein it meshes the gear without backlash and a loading position remote from the gear, a piston-cylinder device for effecting such pivotal movement, the piston being connected by a pivot to the housing and the cylinder being pivoted to a part movable relative to the frame, and a releasable clamp for securing said piston pivot to the housing, said part being movable relative to the frame when said clamp is applied to move the pinion from said first-mentioned position to a position wherein it meshes the gear with backlash.

20. A machine according to claim 19 wherein said part is operated by a spring to move the pinion to the last-mentioned position thereof and is operated in the opposite direction by fluid pressure, and there are means to adjust the amplitude of such motion of the part.

21. A machine according to claim 20 in which said part comprises a lever pivoted to the cylinder and also pivoted relative to the frame.

22. In a machine for running together a pair of bevel or hypoid gears, said machine including a gear-carrying spindle for the larger member of the pair and a pinion-carrying spindle for the smaller member of said pair and means for moving said pinion-carrying spindle from a selected reference position through a small axial displacement relative to said gear-carrying spindle while the gears are being run in mesh with each other, the improvement comprising: indication means responsive to the amplitude of vibrations induced by said gears running in mesh while the pinion-carrying spindle is being moved through said axial displacement for indicating the position of the pinion-carrying spindle, relative to said reference position, in which the amplitude of such vibration is minimum.

23. The machine according to claim 22 wherein said indication means further comprises means for stopping said axial displacement movement when the pinion-carrying spindle is in said minimum vibration position.

References Cited

UNITED STATES PATENTS

| | | | |
|---|---|---|---|
| 1,644,876 | 10/1927 | Domizi | 73—162 |
| 1,981,693 | 11/1934 | Firestone et al. | 73—162 XR |
| 2,582,408 | 1/1952 | Bauer | 51—26 |
| 2,757,537 | 8/1956 | Warren | 73—162 |
| 2,828,584 | 4/1958 | De Wolf et al. | 51—34 |
| 3,069,813 | 12/1962 | Bauer et al. | |
| 3,176,512 | 4/1965 | Hediger | 73—162 |
| 3,280,624 | 10/1966 | Weinert | 73—162 |

S. CLEMENT SWISHER, Primary Examiner